June 17, 1958 H. NEUMANN 2,839,675
ATTENUATOR OF NOISE IN RADIO-SETS
Filed July 15, 1953
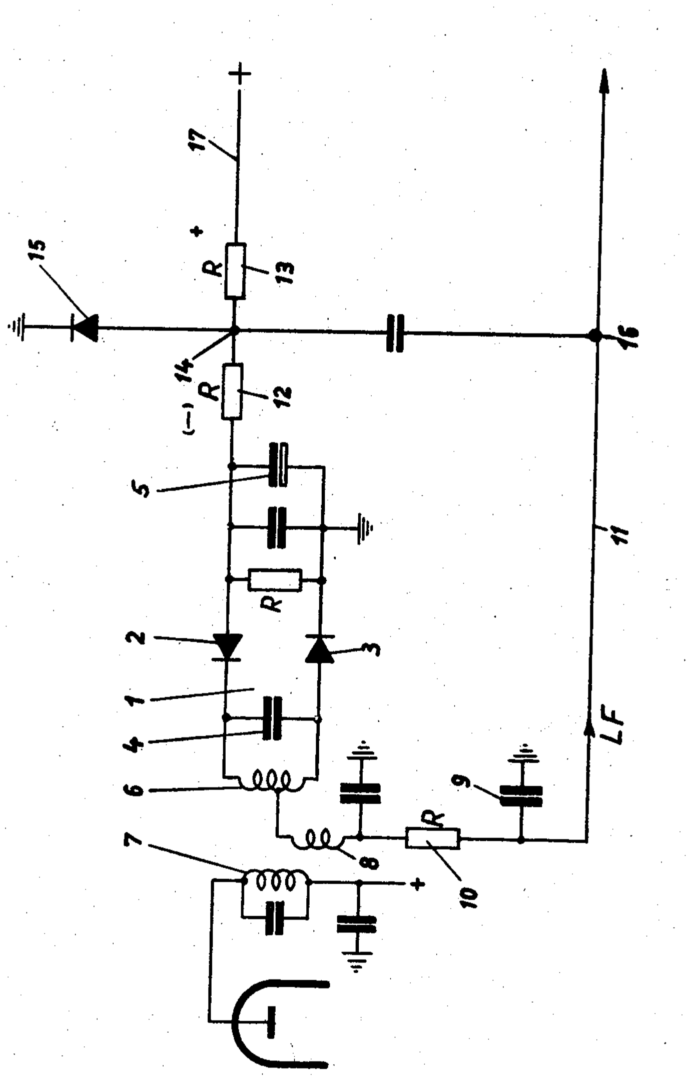
INVENTOR
H. NEUMANN
BY Philip M. Bolton
ATTORNEY 2,839,675
Patented June 17, 1958

2,839,675

ATTENUATOR OF NOISE IN RADIO SETS

Hubert Neumann, Pforzheim, Germany, assignor to International Standard Electric Corporation, New York, N. Y., a corporation of Delaware Application July 15, 1953, Serial No. 368,170

Claims priority, application Germany July 18, 1952

2 Claims. (Cl. 250—20)

The present invention relates to a method of attenuating the noise appearing in radio sets, particularly with regard to FM-receivers. In the absence of a receiving voltage there appears, in receivers having high amplification, a strong receiver noise which is due to a number of effects caused by the tubes themselves. This noise is of a specially disturbing nature in the case of FM-receivers, because these receivers reproduce a relatively wide frequency band. The noise of the receiver will be still increased if there is provided an automatic volume control, because in the case of weak incoming carriers an increased noise voltage will appear on account of the automatic volume control and the high amplification which is due thereto.

For the purpose of preventing these noises it is well known to employ the so-called "silent tuning," in the course of which the reproduction of the receiver will be made ineffective if the receiver has been tuned to a frequency admitting no carriers. Thus for instance, in the conventional arrangements, by rectifying the noise voltages, which fluctuate in their amplitude, and in a stage which is influenced by the amplitude limiter, a low-frequency voltage corresponding to the noise will be obtained in the case of an absent carrier and will be used, after having been rectified, for feeding one of the subsequent tubes.

Furthermore it is known to filter-out the parts of the noise spectrum lying outside the signal spectrum and to use them, after having been amplified and rectified, as a control voltage for reducing the total amplification in the case of an increased noise level.

Other types of conventional arrangements which relate to the suppression of disturbances in radio receiving sets, make use of an electrically or mechanically controlled switching device which is controlled by the disturbance itself and which, whenever a disturbance occurs, causes the audio-part to become ineffective during this time.

In addition to the foregoing an arrangement is known in which the useful voltage is transmitted as a criterion instead of the disturbance and in which the voltage appearing at the two output resistances of the two diodes of a discriminator is used as a locking voltage.

Finally, and in the course of using the useful voltage for unblocking the receiver, it has also been suggested to provide one or more electron tubes, which are arranged between the high frequency-part and the audio-part of the receiver, with a corresponding negative blocking voltage.

In accordance with the present invention the feeder line leading to the audio-part is coupled automatically to ground in the absence of the useful voltage, and automatically disconnected from ground in the case of reception of intelligence signals. Further, in accordance with my invention the switching-on and -off of the feeder line is performed by a rectifier which is positively biased in the absence of the useful voltage and negatively biased when receiving the useful voltage. The ground connection is made when the rectifier is positively biased, and the ground connection is blocked in the case of a negative bias. Conveniently a crystal or germanium diode is employed, because these types of diodes exhibit a blocking voltage which is rapidly effective, or have a quickly ascending resistance curve, so that a relatively small differential voltage suffices to permit them to become effective, thus making the arrangement considerably more sensitive.

The invention will be particularly described with reference to an embodiment represented in the accompanying drawing. The illustration shows an exemplified circuit arrangement for carrying out the invention. The circuit components which are deemed unnecessary for the explanation of the invention, however, have been excluded from the representation for reasons of clearness.

Reference numeral 1 indicates a conventional type ratio detector circuit in a skeleton diagram in which 2 and 3 denote the rectifiers, 4 the condenser of the high frequency-circuit, 5 the limiter condenser and 6 the coil of the high frequency-circuit of the ratio detector, 7 represents the primary circuit of the detecting transformer. The winding 6 has been tapped in the known manner and is connected with a coupling coil 8, which in turn is applied to a de-emphasis circuit comprising e. g., the condenser 9 and the resistance 10. One terminal of the resistance 10 is connected to the feeder line 11 leading to the audio stage, for instance, to the audio-amplifier. To the negative pole of the condenser 5 there is coupled a resistance 12, to which an equivalent resistance 13 is connected in series. It is convenient to choose the size of these resistances to be high-ohmic in relation to the resistance 10. The connecting point 14 of the two resistances is connected with the rectifier 15 which is coupled to a common negative terminal, i. e. ground, and with a point 16 of the feeder 11. From resistance 13 there is a connection to a positive source of constant voltage.

In the case when no signal intelligence is being received, a positive potential dominates as at 14 with respect to the negative potential tapped from the ratio-detector, so that the rectifier 15, becomes conductive and effectively couples point 16 to ground, thereby producing at the audio-amplifier, on account of the high-ohmic resistance 10 (e. g. 100 kilohms), and the filtering of noise frequencies by the filter comprising resistor 10 and capacitor 9, practically no effective noise level at the grid of the audio-amplifier. If now a station is being received, then the negative voltage which is tapped from the ratio detector will prevail at the rectifier, causing it to become highly-resistive and disconnecting point 16 from ground. In this way the useful voltage detected by the ratio-detector, will be applied in the full strength to the grid of the audio-amplifier. It is preferred that a germanium diode be used for the rectifier 15 because it has a quickly ascending blocking characteristic, so that a small difference between the two reference voltages will be sufficient for operating the diode. In this way the arrangement will become very sensitive and a voltage comprising a few volts will be sufficient as a positive voltage.

An outstanding feature of the invention is that a positive voltage is used as a constant reference voltage. In this manner this voltage may be tapped at any point of the current supply without it being necessary to provide a special source for generating this voltage, whereas a negative constant bias is obtained by means of additional circuit arrangements and rectification. On the other hand the negative component of the reference voltage may be tapped, according to the present invention, in a simple manner without a special source of transformation, and without the employment of a special rectifier, at the discriminator.

What is claimed is:

1. In a frequency modulation receiver having a frequency-discriminating circuit and an audio-frequency circuit coupled to the output of said discriminator circuit, means for preventing noises originating in said receiver from reaching the audio circuit during those periods when no signal is being received, comprising an element having a conducting and a non-conducting condition, means coupling a terminal of said element to an output of said discriminator circuit and in the path of said audio circuit, a common negative terminal, means coupling a second terminal of said element to said common negative terminal, a source of positive voltage, means coupling said souce to said element for rendering it conducting during periods of no signal reception thereby coupling the output of said discriminator to said common negative terminal and preventing noises from reaching the audio circuit, means coupled between said discriminator circuit and said element for producing a negative voltage in response to input signals, the negative voltage having a value sufficient to overcome the positive voltage and thereby render said element non-conducting, whereby the path between the output of the discriminator circuit and the audio circuit is uninterrupted.

2. The receiver according to claim 1 wherein said two-condition element comprises a rectifier.

References Cited in the file of this patent

UNITED STATES PATENTS

| | | |
|---|---|---|
| 2,496,818 | Seeley | Feb. 7, 1950 |
| 2,501,120 | Carlson | Mar. 21, 1950 |

FOREIGN PATENTS

| | | |
|---|---|---|
| 624,522 | Great Britain | June 10, 1949 |